United States Patent
Boedinger

Patent Number: 5,676,891
Date of Patent: Oct. 14, 1997

[54] METHOD FOR MANUFACTURING A PHOSPHOR CERAMIC BY HOT-PRESSING

[75] Inventor: Hermann Boedinger, Puchheim, Germany

[73] Assignee: Siemens Aktiengesellschaft, Munich, Germany

[21] Appl. No.: 501,736

[22] Filed: Jul. 12, 1995

[30] Foreign Application Priority Data

Jul. 21, 1994 [DE] Germany .................. 44 25 922.0

[51] Int. Cl.⁶ .............. B29D 11/00; G02B 1/00; C09K 11/00; B29C 67/00
[52] U.S. Cl. .............. 264/1.22; 264/125; 264/21
[58] Field of Search .............. 264/1.22, 21, 122, 264/125

[56] References Cited

U.S. PATENT DOCUMENTS

| | | | |
|---|---|---|---|
| 4,039,697 | 8/1977 | Isawa et al. | 427/27 |
| 4,101,348 | 7/1978 | Berchtold | 148/105 |
| 5,282,985 | 2/1994 | Zabinski et al. | 252/12 |
| 5,296,163 | 3/1994 | Leppert et al. | 252/301.4 |
| 5,518,658 | 5/1996 | Rossner et al. | 252/301.4 |
| 5,518,659 | 5/1996 | Rossner et al. | 252/301.4 |

*Primary Examiner*—Donald E. Czaja
*Assistant Examiner*—Jacqueline A. Ruller
*Attorney, Agent, or Firm*—Hill, Steadman & Simpson

[57] ABSTRACT

For manufacturing a high-density, transparent phosphor ceramic, a ceramic press mold is employed which is lined with an intermediate layer containing $MoS_2$, and an initial phosphor material is pressed in a single-axis manner therein under elevated temperature to form the luminous ceramic.

8 Claims, 1 Drawing Sheet

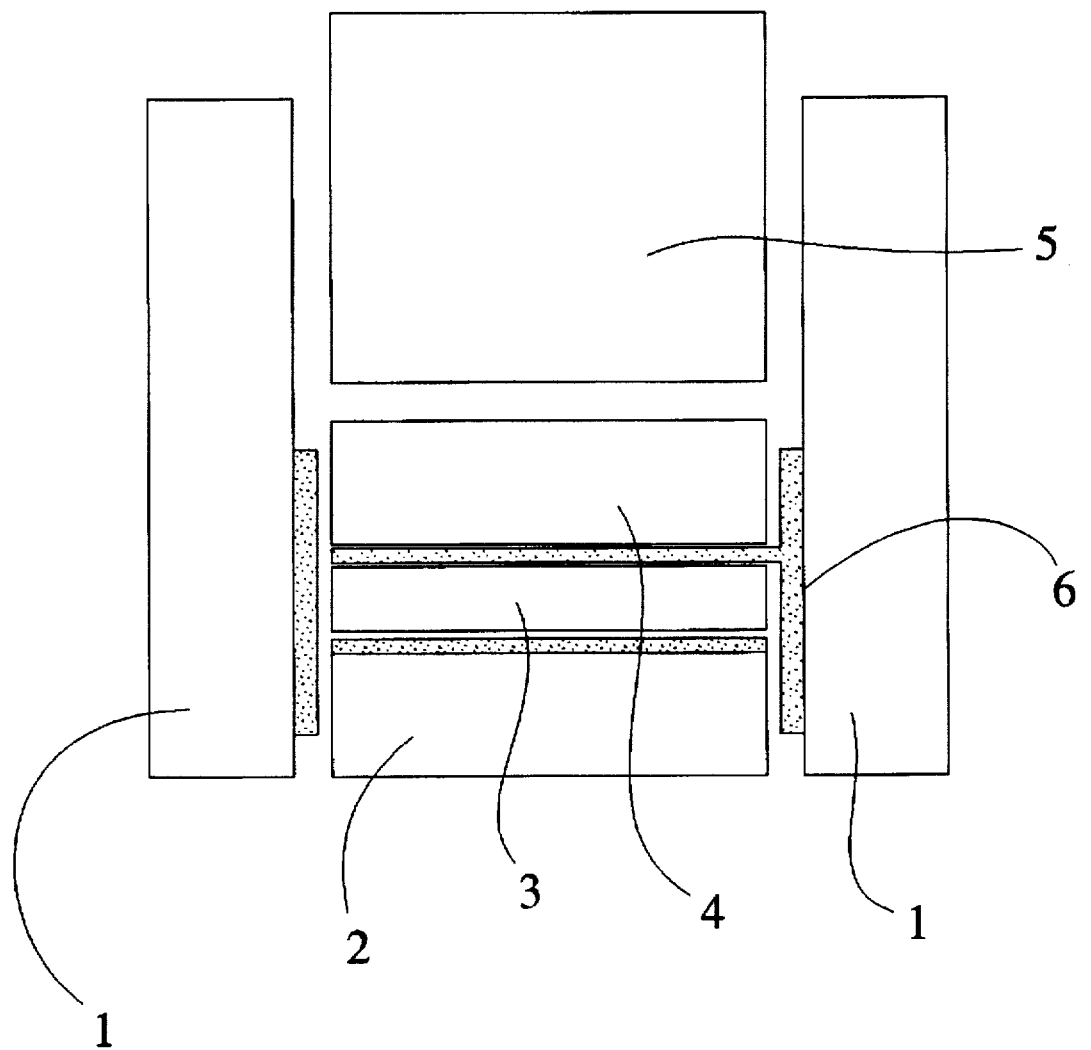

METHOD FOR MANUFACTURING A PHOSPHOR CERAMIC BY HOT-PRESSING

BACKGROUND OF THE INVENTION

1. Field of the Invention

The present invention is directed to a method for manufacturing a phosphor ceramic by hot-pressing, and in particular to a method for manufacturing a high-density phosphor ceramic by single-axis hot-pressing.

2. Description of the Prior Art

Ceramic phosphors can be utilized for detecting high-energy radiation. For example, X-radiation can be converted into visible light using a ceramic phosphor so that an x-ray image can be acquired and interpreted by conventional methods.

Phosphors from the compound class of rare earth oxisulfides can be used for high-sensitivity radiation detectors, for example in X-ray computed tomography systems. Suitably prepared phosphor powders of this compound class can be processed into a high-density phosphor ceramic by single-axis hot-pressing, this ceramic having optical transmission properties ranging from translucent through transparent. For example, German OS 42 24 931, corresponding to U.S. Pat. No. 5,296,163 discloses such a method. A high light yield given adequately low afterglow can be achieved by suitable doping of the phosphor ceramic.

Press dies of ceramic that can be composed of aluminum oxide, graphite or silicon carbide are employed for the hot-pressing process. Undesired reactions between the phosphor powder to be pressed and the die material occur, however, at the high pressing temperatures of 1100° C. through 1500° C. that are required. Due to the chemical bonds being formed, high adhesion occurs between the phosphor ceramic and the die. As a result, cracks that can be attributed to the different expansion coefficients of the phosphor ceramic and the die material occur in the phosphor ceramic during cooling. Moreover, the phosphor ceramic can no longer be expressed out of the die.

In order to avoid these disadvantages, molybdenum or tungsten foils can be utilized as an intermediate layer between the die material and the phosphor to be pressed. The rare earth oxisulfides do not enter into any compound with molybdenum or tungsten at these temperatures and only exhibit surface reactions. As a result, the sintered rare earth oxisulfide ceramic can be easily expressed from the press die. The ceramic that has been produced thereby remains undamaged.

Employing these metal foils as intermediate layers, however, produces additional disadvantages. The metal foils are difficult to process and therefore can not be exactly tailored to the press die. Further, the metal foils can only be employed once, that the process is expensive because of the high price of the metal foils. Further, a folding or creasing of the foil occurs during hot-pressing, possibly leading to a destruction of the phosphor ceramic and of the die material. Crack formation can still occur in the phosphor ceramic in the lateral overlapping region of the individual foil parts. The folding or creasing and, thus, the risk of damage to the phosphor ceramic can in fact be reduced by employing thicker and more exactly cut metal foils having a thickness of about 0.2 through 0.3 mm. At the same time, however, the introduction of the metal foil into the press die becomes more difficult and the material consumption of expensive metal foil is also increased.

SUMMARY OF THE INVENTION

It is an object of the present invention to provide a modified hot-pressing method which leads to an optically faultless phosphor ceramic, which can be more simply and economically implemented than known methods, and wherein the risk of damage to the phosphor ceramic during the hot-pressing process and upon removal from the die is reduced.

The above object is achieved in accordance with the principals of the present invention in a method for manufacturing a phosphor ceramic including the steps in producing an intermediate layer containing $MoS_2$ in a ceramic press mold, filling the press mold with initial (starting) phosphor material, and single-axis pressing the initial phosphor material above its sintering axis temperature in the press mold to form a high-density, transparent phosphor ceramic.

The methodological problems relating to molding difficultly are solved in a simple way in the inventive method by producing the intermediate layer containing molybdenum sulfide on the surface of the mold cavity ceramic press die or mold. No damage to the ceramic whatsoever occurs during cooling and unmolding.

That an optically pure ceramic is obtained with the inventive method, however, is surprising. The ceramic exhibits no diminution of its luminous intensity and no increased afterglow compared to phosphor ceramics manufactured according to known methods. This indicates that no contaminants whatsoever are introduced into the phosphor ceramic with the method even though the ceramic is extraordinarily sinter-active and thus highly reactive. The result is even more surprising since molybdenum sulfide is a black powder and one would expect that it would lead to undesired inclusions into the luminous ceramic that could cloud the otherwise transparent ceramic body. This would be expected to deteriorate the optical properties of the phosphor ceramic and complicate the employment thereof for high-resolution radiation detectors.

Moreover, the hot-pressing process is usually implemented at temperatures that lie at the decomposition temperature of the molybdenum sulfide of about 1200° C. through 1300° C. This also causes one to expect the penetration and inclusion of molybdenum sulfide into the phosphor ceramic. None of these expected disadvantages occurred, however, in the inventive method. Only residues of the intermediate layer adhering superficially to the phosphor ceramic were observed, these being easily removed. No contaminants whatsoever are observed or detected in the volume, i.e. in the inside of the phosphor ceramic.

The intermediate layer can be produced in a simple way by rubbing the surface of the cavity press die with molybdenum sulfide powder.

Another possibility for producing the intermediate layer is to spray the surface of the cavity press die with a conventional spray that contains molybdenum sulfide powder. Since this spray, however, also contains organic constituents, this modification of the method requires a subsequent baking of the sprayed press die in order to eliminate the organic constituents of the spray. An intermediate layer that adheres well and is sufficiently thick also arises in this way.

In a further embodiment of the invention, the phosphor powder required for manufacturing the phosphor ceramic is pre-pressed. This can ensue before the intermediate layer is produced or can ensue in another press mold that is not provided with an intermediate layer containing molybdenum sulfide. The green phosphor ceramic product produced by the pre-pressing is thereby compressed to such an extent that the merely superficial adhesion of residues of the intermediate layer on the phosphor ceramic is reduced further.

The inventive method is especially suited for producing a phosphor ceramic from the system of rare earth oxisulfides. These phosphors have a general composition $(M_{1-x}Ln_x)_2O_2S$, wherein M is at least one element from the group Y, La and Gd, Ln is at least one element from the group Eu, Pr, Tb, Yb, Dy, Sm and Ho, and $(2\times10^{-1})\geq x\geq(1\times10^{-6})$. When this phosphor powder is produced according to a method disclosed by the aforementioned OS 42 24 931 and U.S. Pat. No. 5,296,163 (the teachings of the latter being incorporated herein by reference), it is adequately sinter-active and can be pressed to form a high-density luminous ceramic. These powders have a large surface of at least 10 $m^2$/g (measured with a gas absorption method according to BET). The hot-pressing process itself is implemented in a vacuum or under an atmosphere chemically characterized as being in a range from inert through reducing. A pressing power of 0.1 through 10 $kN/cm^2$ (1 through 100 MPa) is thereby exerted and a temperature of 1100° C. through 1300° C. is set.

DESCRIPTION OF THE DRAWINGS

The single Figure shows a schematic cross-section through an apparatus for the implementation of the inventive method.

DESCRIPTION OF THE PREFERRED EMBODIMENTS

A ceramic mold fabricated of, for example, $Al_2O_3$ is composed of a mold member 1 fashioned as a hollow cylinder, a first intermediate disk 2 and a second intermediate disk 4.

At least those surfaces of the intermediate disks 2 and 4 facing toward the green compact and the inside wall of the hollow cylinder 1 (forming the surfaces of the mold cavity) are sprayed with a commercially available $MoS_2$ spray. The solvent is allowed to evaporate and the organic binder of the spray is then burned away in air out at approximately 500° C. The intermediate layer 6 arises.

The first intermediate disk 2, the initial material (initial phosphor material) to be pressed, for example a pre-pressed green product 3 of a $Gd_2O_2S$ doped as a phosphor, the second intermediate disk 4 and, finally, the die 5, which likewise preferably has a matching cross-section, are then successively placed on top of one another in the hollow cylinder 1.

The mold is then placed completely into a hot press and is pressed therein for approximately 12 hours in a vacuum given a maximum pressing power of 50 MPa and a maximum temperature of 1250° C. The pressed article can subsequently be unproblematically unmolded without damage.

The inventive method, however, is not limited to the system of rare earth oxisulfides. It can be utilized for all ceramic hot-pressing processes wherein a high purity of the pressed article or the ceramic produced by the hot-pressing process is required, such as, for instance, given a phosphor ceramic wherein even the minutest contaminants can lead to a deterioration of the luminous properties. The method is always suitable whenever the ceramic powder to be pressed or some other initial material does not enter into any chemical reaction with the molybdenum sulfide. The method cannot be employed in hot-press processes that must be implemented at higher temperatures above 1300° C. and/or in an oxygen containing atmosphere since the $MoS_2$ already decomposes at 600° C. through 800° C. in oxygen. In addition, $SO_2$ can then also arise.

Although modifications and changes may be suggested by those skilled in the art, it is the intention of the inventors to embody within the patent warranted hereon all changes and modifications as reasonably and properly come within the scope of their contribution to the art.

I claim as our invention:

1. A method for manufacturing a phosphor ceramic comprising the steps of;

providing a ceramic press mold having a molding cavity with a cavity surface;

producing an intermediate layer containing $MoS_2$ on said cavity surface;

selecting a phosphor powder as an initial phosphor material having a general composition $(M_{1-x}Ln_x)_2O_2S$, wherein M comprises at least one element selected from the group consisting of Y, La and Gd, Ln comprises at least one element selected from the group consisting of Eu, Pr, Tb, Yb, Dy, Sm and Ho, and $(2\times10^{-1})\geq x\geq(1\times10^{-6})$;

filling said cavity with said initial phosphor material, said initial phosphor material having a sintering temperature; and single-axis pressing said initial phosphor material above its sintering temperature in said cavity to form a high-density, transparent, optically pure phosphor ceramic.

2. A method as claimed in claim 1 wherein the step of producing said intermediate layer comprises rubbing said surface of said cavity with $MoS_2$ powder.

3. A method as claimed in claim 1 wherein the step of producing said intermediate layer comprises spraying said surface of said cavity with a spray containing $MoS_2$ powder and organic constituents and subsequently baking said organic constituents out.

4. A method as claimed in claim 1 comprising the additional step of forming a green compact for use as said initial phosphor material by pre-pressing a phosphor powder having a selected composition in a press mold without said intermediate layer to form said green compact.

5. A method as claimed in claim 1 comprising the additional step of selecting a composition for said initial phosphor material for producing a phosphor ceramic of a rare earth oxisulfide system.

6. A method as claimed in claim 1 wherein the step of single-axis hot-pressing comprises single-axis hot-pressing said phosphor powder in said cavity in a vacuum with a pressing power in a range from 0.1 through 10 $kN/cm^2$ and at a temperature in a range from 1100° C. through 1300° C.

7. A method as claimed in claim 1 wherein the step of single-axis hot-pressing comprises single-axis hot-pressing said phosphor powder in said cavity in an inert through reducing atmosphere with a pressing power in a range from 0.1 through 10 $kN/cm^2$ and at a temperature in a range from 1100° C. through 1300° C.

8. A method as claimed in claim 1 wherein the step of selecting a phosphor powder includes selecting a phosphor powder having a specific surface measured by a gas absorption method according to BET of at least 10 $m^2$/g.

* * * * *